(12) United States Patent
Danciu

(10) Patent No.: US 7,639,262 B2
(45) Date of Patent: *Dec. 29, 2009

(54) SELECTING RENDERING INTENTS

(75) Inventor: Ioana M. Danciu, Mercer Island, WA (US)

(73) Assignee: Adobe Systems Incorporated, San Jose, CA (US)

( * ) Notice: Subject to any disclaimer, the term of this patent is extended or adjusted under 35 U.S.C. 154(b) by 478 days.

This patent is subject to a terminal disclaimer.

(21) Appl. No.: 11/226,481

(22) Filed: Sep. 14, 2005

(65) Prior Publication Data

US 2006/0001931 A1    Jan. 5, 2006

(51) Int. Cl.
G09G 5/02 (2006.01)
H04N 1/46 (2006.01)

(52) U.S. Cl. .............. 345/589; 345/594; 358/500

(58) Field of Classification Search ............. 345/589, 345/594; 382/162; 358/500
See application file for complete search history.

(56) References Cited

U.S. PATENT DOCUMENTS

| | | | | |
|---|---|---|---|---|
| 5,109,480 A | 4/1992 | Sone et al. | ............. | 345/589 |
| 5,231,504 A | 7/1993 | Magee | ............. | 358/500 |
| 5,257,097 A | 10/1993 | Pineau et al. | ............. | 358/500 |
| 5,384,608 A | 1/1995 | Gersten | ............. | 351/212 |
| 5,444,544 A | 8/1995 | Oka et al. | ............. | 386/1 |
| 5,604,610 A | 2/1997 | Spaulding et al. | ............. | 358/525 |
| 5,644,647 A * | 7/1997 | Cosgrove et al. | ............. | 382/162 |
| 5,748,342 A | 5/1998 | Usami | ............. | 358/500 |
| 5,843,070 A | 12/1998 | Cambier et al. | ............. | 606/5 |
| 5,844,542 A | 12/1998 | Inoue et al. | ............. | 345/594 |
| 5,989,189 A | 11/1999 | LeBlanc et al. | ............. | 600/437 |
| 6,004,270 A | 12/1999 | Urbano et al. | ............. | 600/443 |
| 6,047,227 A | 4/2000 | Henderson et al. | ............. | 701/50 |
| 6,108,008 A | 8/2000 | Ohta | ............. | 345/590 |
| 6,333,752 B1 | 12/2001 | Hasegawa et al. | ............. | 345/764 |
| 6,508,812 B1 | 1/2003 | Williams et al. | ............. | 606/5 |
| 6,549,607 B1 | 4/2003 | Webber | ............. | 378/8 |
| 6,701,011 B1 | 3/2004 | Nakajima | ............. | 382/167 |
| 2001/0017719 A1 | 8/2001 | Asano | ............. | 358/518 |
| 2002/0028994 A1 | 3/2002 | Kamiyama | ............. | 600/437 |

(Continued)

OTHER PUBLICATIONS

Macromedia, Inc., *Macromedia Introduces FireWorks™*, Mar. 10, 1998, (www.macromedia.com/macromedia/proom/pr/1998/fireworks.html).

(Continued)

*Primary Examiner*—Ryan R Yang
(74) *Attorney, Agent, or Firm*—Fish & Richardson P.C.

(57) ABSTRACT

Method and apparatus for selecting rendering intent including computer program product. A set of rendering intents, and a colored document or image is received. A set of rendered images are created and simultaneously previewed by rendering the received image according to the received rendering intents. Alternatively, a set of rendered differences are created from the rendered images and simultaneously previewed. Difference images reflect differences between rendered images and a reference image. Reference images can be either the source image or another rendered image. Rendered images or differences are simultaneously previewed by simultaneously displaying them on a monitor, or by printing them on a single sheet of paper. A rendered image or difference is selected by user input. The rendered images or difference images are associated with a rendering intent. The associated rendering intent is selected to render the received document or image.

25 Claims, 3 Drawing Sheets

U.S. PATENT DOCUMENTS

2002/0055681 A1    5/2002    Averkiou et al. ............ 600/458

OTHER PUBLICATIONS

Schmitt, B., *Fireworks: Works as Advertised*, May 22, 1998, (http://designshops.com/pace/ds/pub/98/05/22/feature/index.html).

Schmitt. B., *Optimization: Quality vs. Speed*, May 22, 1998, (http://designshops.com/pace/ds/pub/98/05/22/feature/index4.html).

Nicholls, D., *A Guide to Web Image Compression Software: PhotoGIF Filter*, Apr. 1998, (http://www.home.aone.net.au/byzantium/graphics/btphgif.html).

King, A.B., *Tools, Tips and Techniques: Optimizing Web Graphics*, Jun. 10, 1996, (http://www.webreference.com/dev/graphics/tools.html).

Kaiser, J., *Color the Web*, Mar. 26, 1998, (http://webdesign.meningco.com/library/weekly/aa032698.htm).

Barzeski, E.J., *Furbo Filters*, Feb. 1998 (http://www.furbo-filters.com/filters.html).

Hockenberry, C., et al., *Webmaster Series*, 1998 (http://www.furbo-filters.com/previw.html).

McClelland, D., *Best Photoshop Plug-ins*, Feb. 1998 (http://macworld.znet.com/pages/february.98/Column.4143.html).

Adobe Systems Incorporated, *Lock and Web-shift Colors*, 2000 (http://www.adobe.com/web/tips/imgrwebshnift/main.html).

Adobe Systems Incorporated, *Taming the Monsters of Web Imagery*, Mar. 1998.

Adobe Systems Incorporated, *Adobe® ImageReady, version 1.0, At A Glance*, Apr. 1998.

Adobe Systems Incorporated, *Adobe® ImageReady, version 1.0, New Product Highlights*, Apr. 1998.

Adobe Systems Incorporated, *Adobe® Indesign 1.0 Users Guide for Windows 7 Macintosh*, pp. 291-319, 1999.

Simone, "Web Graphics Software Packages: Software Review: Evaluation", PC Magazine, vol. 17, No. 19, pp. 197, Nov. 1998.

\* cited by examiner

SELECTING RENDERING INTENTS

CROSS-REFERENCE TO RELATED APPLICATION

This application claims the benefit of priority to U.S. application Ser. No. 09/644,136 filed Aug. 22, 2000, the disclosure of which is incorporated by reference.

TECHNICAL FIELD

This invention relates to a method for selecting a suitable rendering intent to map the colors of an image created, displayed, or produced in one color gamut for display, production, or reproduction in another color gamut.

BACKGROUND

Color devices, such as color monitors and color printers, are limited in the number of colors they can produce. The range of colors a given color device is capable of producing is known as that device's color gamut.

When a colored electronic document or image having colors contained within one color gamut, is reproduced on or displayed in a device having a different color gamut, color reproduction problems can occur. For example, some of the colors in a document created by selecting colors from the color gamut of a display monitor may not be available in the color gamut of a printer to which the document is sent to be printed. Similarly, a color represented as the color triplet ($R_1$, $G_1$, $B_1$) on the color monitor, may be reproducible on a color printer, but from the color triplet ($R_2$, $G_2$, $B_2$) rather than the triplet ($R_1$, $G_1$, $B_1$).

Rendering intents are algorithms which have been developed to alleviate such color reproduction problems by suitably mapping colors from the color gamut of one device to the color gamut of another device. Four such rendering intents are commonly available, and are referred to as perceptual, saturation, absolute calorimetric, and relative colorimetric rendering intents. Other rendering intents are possible, however, and any algorithm which defines a transformation or mapping of colors from one color gamut to another color gamut is a rendering intent.

While rendering intents can alleviate color reproduction problems, they do not solve them. Thus a color which is within the color gamut of one device but outside the color gamut of another device cannot be faithfully reproduced on the second device, irrespective of the rendering intent chosen. Moreover, different rendering intents will produce different colors on the second device as they attempt to approximate the out of gamut color.

A user who is sensitive to the color content of a document or image will be sensitive to the various color approximations produced by different rendering intents as they transform colors from one color gamut to another. Such a user may want to compare the effects different rendering intents will have on the colors in their documents or images prior to selecting one of the intents to transform their documents. Currently, users may only compare the effects different rendering intents have on the colors in documents indirectly. For example, they can select a rendering intent, preview a rendered image, and then either accept the rendering intent or select an alternate rendering intent.

The current process is cumbersome, requires the user to anticipate whether a current rendering intent is better than one which has yet to be viewed, and also requires the user to remember large amounts of information such as subtle differences in color between different rendered images. A method is needed for selecting a desired rendering intent which is less cumbersome, does not require anticipating the quality of images which have yet to be viewed, and does not require the user to remember large amounts of subtle information.

SUMMARY

A rendering intent selection engine is disclosed. The engine selects a rendering intent to render the colors of a source document or image having colors contained entirely within a source color gamut so that the document can be displayed, printed, or otherwise output to a destination device having a different destination color gamut.

The rendering intent selection engine receives a color document or image and a set of rendering intents. It renders the image according to the received rendering intents, and simultaneously previews the rendered images. It receives a selection from among the simultaneously previewed rendered images, and selects a rendering intent based upon the received rendered image selection.

The rendering intent selection engine can receive an entire document or image, or only a portion of an entire document or image. It can receive user input specifying the portion of a document or image to be rendered. Similarly, the rendering intent selection engine can receive all known rendering intents, or a subset of all known rendering intents. It can receive user input specifying the rendering intents to be used to render the received image.

The rendering intent selection engine can simultaneously preview the rendered images by simultaneously displaying them on a monitor. Or, it can simultaneously preview the rendered images by printing them on a single sheet of paper. Or it can display the color values associated with a rendered image on a monitor, or print them on a single sheet of paper. The rendering intent selection engine can preview differences in rendered images rather than the images themselves. It can preview the differences by simultaneously displaying them on a monitor, or printing them on a single sheet of paper, or by simultaneously displaying the difference values on a monitor or printing them on a single sheet of paper.

The rendering intent selection engine creates the difference images between a rendered image and a reference image. The reference image can be the source image, or another rendered image. A difference image can represent a simple subtractive difference between a rendered image and a reference image. Or it can represent a magnified subtractive difference. A difference image can also represent a least squares difference between the colors of a rendered image and a reference image. Or, it can be a topographical representation of the differences between a rendered image and a reference image. The topographical representation can have a color basis.

The rendering intent selection engine receives user input selecting a previewed rendered image. It identifies the rendering intent associated with the received rendered images and selects it to render the received document or image. The rendering intent selection engine can also receive user input selecting a previewed difference of rendered images. If the reference image in the received difference is the source image, the selection engine identifies the rendering intent associated with the received difference and selects it to render the received document or image. If the reference image in the received difference is another rendered image, the selection engine prompts a user to select a rendering intent from the two rendering intents used to create the rendered images which were used to create the rendered difference image.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
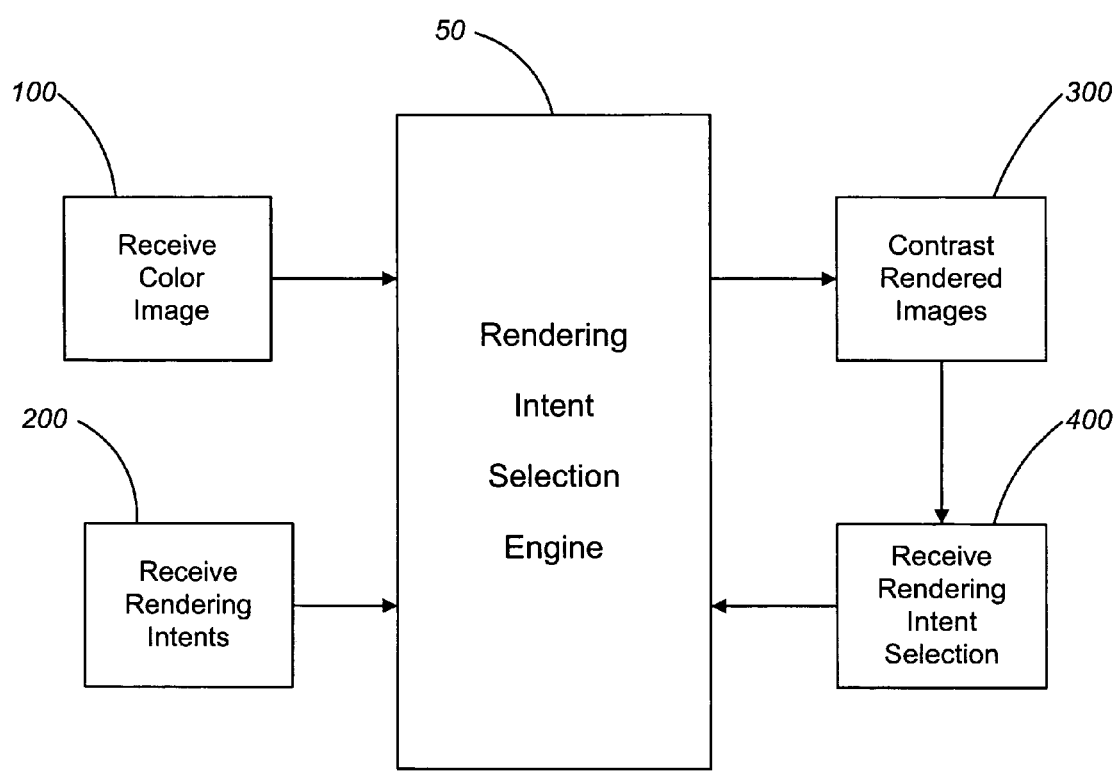
FIG. 1 is a schematic illustration of a rendering intent selection engine.

As shown in FIG. 1, a Rendering Intent Selection Engine 50 receives a color document or image in a Receive Color Image Module 100, and a set of rendering intents in a Receive Rendering Intent Module 200. Selection Engine 50 creates a set of rendered images by rendering the received image according to the set of received rendering intents, and provides a user with a set of contrasted images in Contrast Rendered Images Module 300. Selection Engine 50 permits users to select one of the contrasted images, and thereby receives a rendering intent selection in Receive Selection Module 400.

Selection Engine 50 receives a source color image or document in Receive Image Module 100. The source color document, or image received, contains colors found entirely within the color gamut of a source color gamut. For example, the received image may be a scanned photograph containing only those colors found within the color gamut of the scanner used to scan the photograph. Or the received image may be a bitmap created and displayed on a color monitor, and may therefore contain only those colors found within the color gamut of the display.

Receive Image Module 100 may receive either an entire color image or document, or only a portion of a color image or document, and may prompt and receive commands from a user to display either an entire image or only a portion thereof. For example, Receive Image Module 100 may receive a ten page document, prompt a user to render the entire document or only a portion thereof, and receive user input to render only the second page of the document. The portion of a document or image received by Receive Image Module 100 can be selected in a number of ways well known in the art. For example, a user can select a portion by defining its vertices or edges. Similarly, a user can select a portion by highlighting it with a computer mouse according to well known methods developed in programs having graphical user interfaces. These, and other methods of selecting an entire document, image, or portion thereof, are within the scope of the present invention.

Selection Engine 50 also receives a set of rendering intents in Receive Rendering Intent Module 200. In one implementation, Receive Intent Module 200 receives a set of all known rendering intents. These include perceptual, saturation, absolute colorimetric, and relative calorimetric. In another implementation, Receive Intent Module 200 receives a subset of all known rendering intents. In yet another implementation Receive Intent Module 200 displays a list of all known rendering intents, prompts a user to select a number of intents from the list, and receives the set of rendering intents selected from the list.

Figure 2:
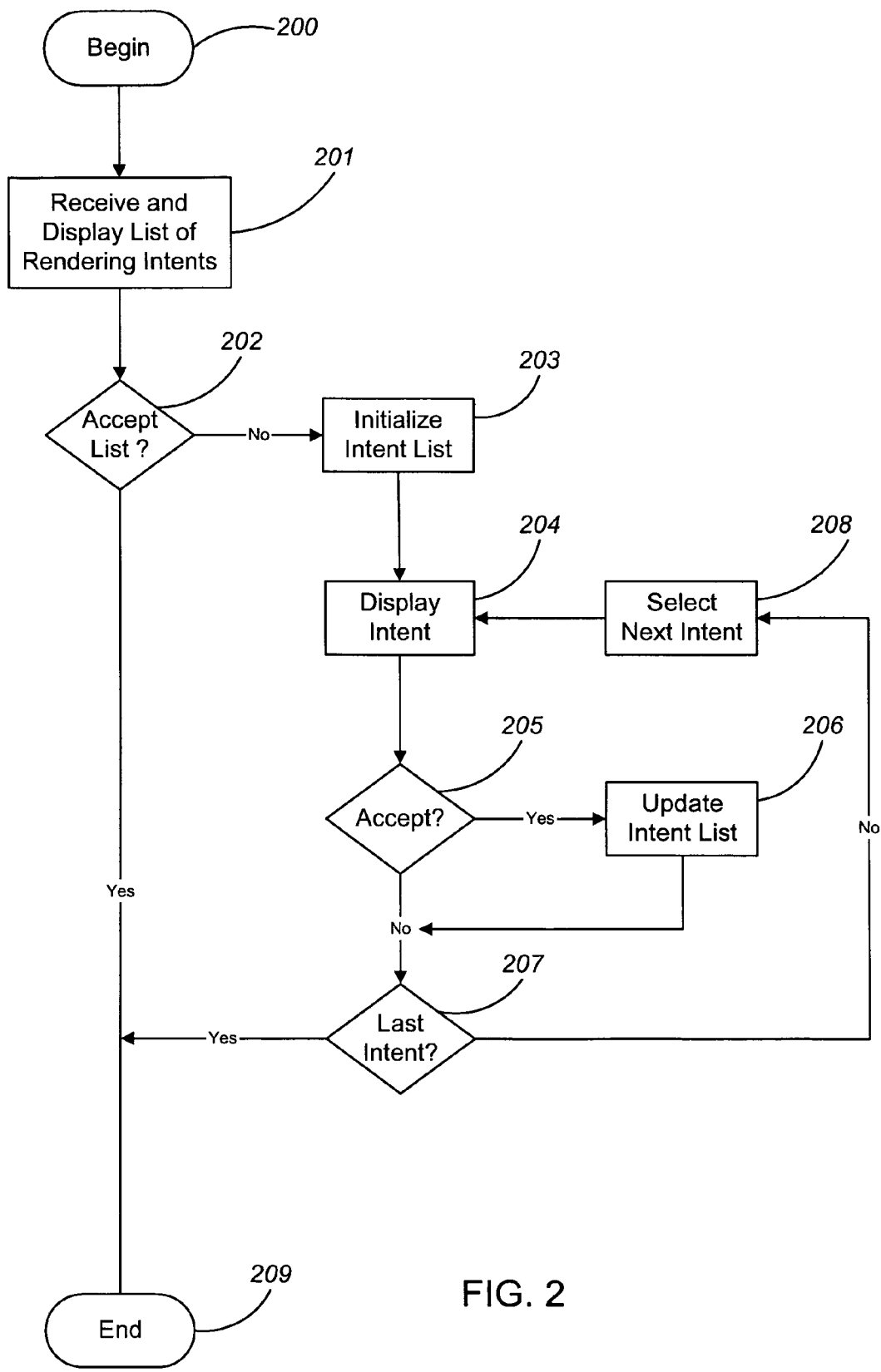
FIG. 2 is a flow chart depicting a method for selecting a plurality of rendering intents to be used to map the colors of an image from one color gamut to another color gamut.

As shown in FIG. 2, in one implementation Receive Intent Module 200 receives and displays a list of all known rendering intents at step 201, together with a list of associated checkboxes. Initially all of the check boxes are selected, however Receive Intent Module 200 allows a user to deselect undesired rendering intents by deselecting their associated checkboxes. At step 202, Receive Intent Module 200 prompts the user to accept the displayed set of selected rendering intents or to preview all available rendering intents. If the user accepts the set of selected rendering intents, Receive Intent Module 200 exits at step 209.

However, if the user elects to preview all available rendering intents, Receive Intent Module 200 initializes a rendering intent list at step 203. In one implementation, the initialization step includes obtaining memory to hold a rendering intent list, initializing the memory to hold a null list, and selecting a first rendering intent as a current rendering intent. Next, Receive Intent Module 200 loops through all known rendering intents in steps 204 through 208, and compiles a list of rendering intents to be used in step 206.

In step 204, Receive Intent Module 200 renders and displays the received image according to the current rendering intent. At step 205, Receive Intent Module 200 prompts the user to accept or reject the current intent. If the user accepts the intent, Receive Intent Module 200 updates a list of received rendering intents at step 206 before proceeding to step 207. If the user rejects the intent, Receive Intent Module 200 proceeds directly to step 207. At step 207, Receive Intent Module 200 determines if the current rendering intent is the last rendering intent. If it is, Receive Intent Module 200 stops execution at step 209. If it is not, Receive Intent Module 200 selects the next known rendering intent at step 208, and reenters the loop for compiling a list of rendering intents by rendering and displaying the received image according to the newly selected current rendering intent at step 204.

As shown in FIG. 1, Selection Engine 50 contrasts a set of rendered images in Contrast Images Module 300. In one implementation, Contrast Images Module 300 contrasts rendered images by simultaneously previewing the rendered images. In another implementation, Contrast Images Module 300 contrasts rendered images by simultaneously previewing rendered image differences.

Figure 3:
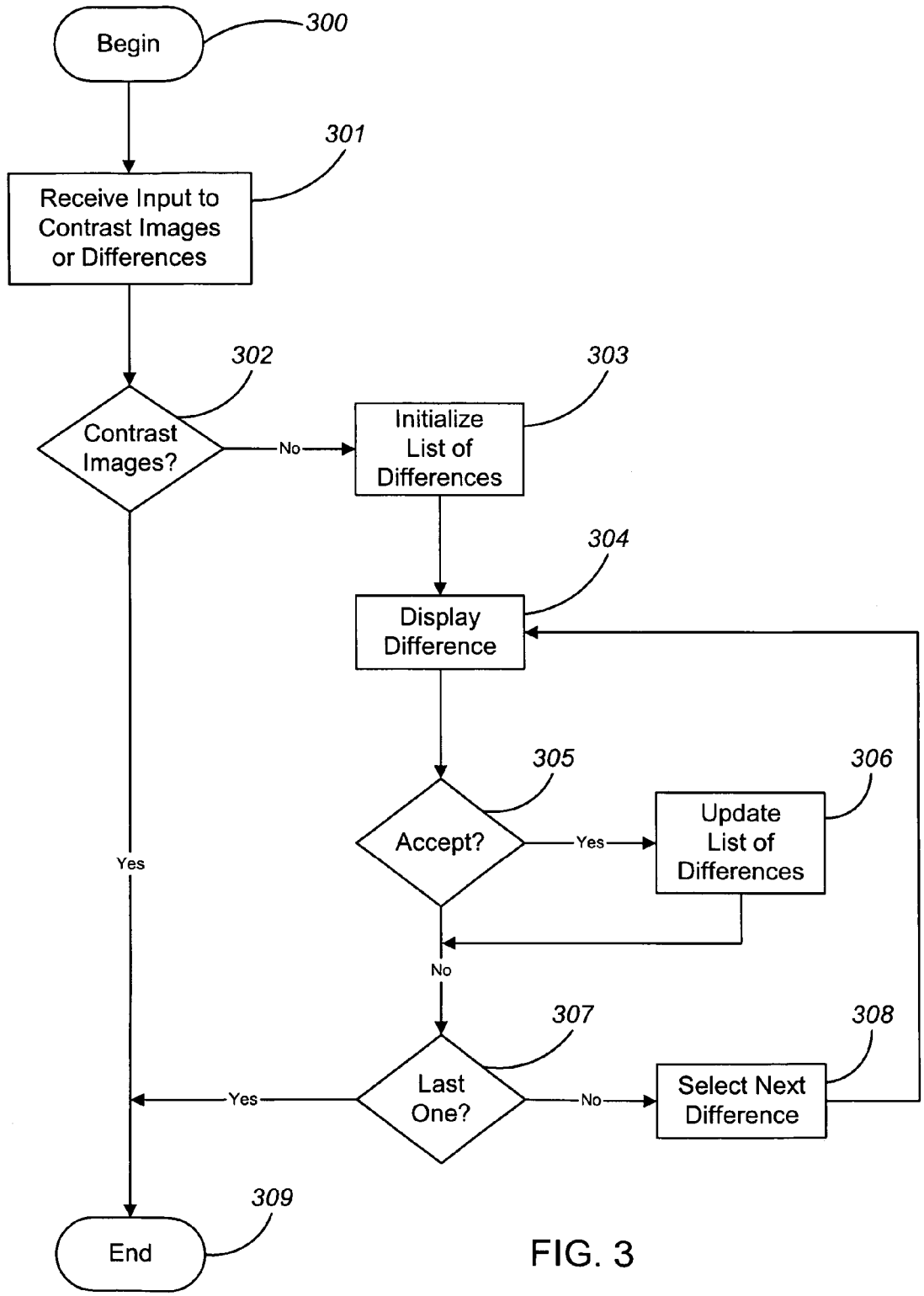
FIG. 3 is a flow chart depicting a method for contrasting rendering intents by choosing to simultaneously display the rendered images, differences between the rendered images, or differences between a rendered image and the given image.

As shown in FIG. 3, in one implementation, Contrast Images Module 300 prompts a user to enter input to contrast either rendered images or rendered differences at step 301. If the user elects to contrast rendered images at step 302, Contrast Images Module 300 contrasts the set of rendered images by previewing them, and exits at step 309. In one implementation, the set of rendered images are previewed by simultaneously displaying them on a monitor. In another implementation, the set of rendered images are previewed by simultaneously displaying their color values, e.g. their RGB pixel values, on a monitor. In yet another implementation, the set of rendered images are previewed by simultaneously printing them on a single sheet of paper. Still other implementations are possible, and within the scope of the claimed invention.

Contrast Images Module 300 may also contrast a set of rendered images by previewing a set of rendered image differences. If a user elects to contrast rendered image differences at step 302, Contrast Images Module 300 initializes a list of rendered differences at step 303. In one implementation, the initialization step includes calculating a list of possible rendered differences, obtaining memory to hold a list of rendered differences, initializing the memory to hold a null list, and selecting a current rendered difference from the list of possible rendered differences. Rendered differences are constructed between a rendered image, and a reference image. In one implementation, the reference image is the received source image. In another implementation, the reference image is another rendered image.

Contrast Images Module 300 can create rendered differences in a number of ways. In one implementation Contrast Images Module 300 creates a simple difference image by subtracting the color values of a reference image from the rendered image. In another implementation, Contrast Images Module 300 creates a least squares difference image by computing for each pixel in the image the sum of the squares of the differences between the color values of the associated pixels in the rendered and reference images. Still other implementations are possible and within the scope of the invention. For example, the values in the difference image can be magnified by multiplying the computed differences by a magnification factor.

In many instances, the differences between the rendered image and reference image are small, and the difference image appears mostly black when displayed on a monitor or printed on a color printer. Thus, in one implementation, Contrast Images Module 300 is configured to create a difference image which is a topographical map of the differences between a rendered and reference image. Further, in one implementation the topographical map is colorized. For example, in one implementation Contrast Images Module 300 creates a a colorized topographical map based on the least squared differences between a rendered image and a reference image. In the topographical map, pixels in the difference image are assigned unique colors based on the least squares difference between the color values of the corresponding pixels in the rendered and reference images. For example, where the least squares difference between a pixel in the rendered and reference images lies in one range, e.g. 0 to 5, the corresponding pixel in the difference image is represented by an associated color, e.g. red. And where the least squares difference lies in another range, e.g. 5 to 10, the corresponding pixel in the difference image is represented by another associated color, e.g. green.

Other methods of creating topographical difference images are possible, and still within the scope of the invention. For example, difference metrics other than the least squares difference metric can be used, such as a weighted least squares difference metric, or a simple difference metric. Or a larger or smaller range of difference values can be associated with a color used in the topographical map. For example, red can be associated with a least squares difference range from 0 to 20, or from 0 to 3. Or different colors can be associated with the ranges of difference values. For example, blue can be associated with difference values ranging between 0 and 5, rather than red. These and similar variations are within the scope of the invention.

As shown in FIG. 3, following initialization step 303, Contrast Images Module 300 loops through the list of possible rendered differences in steps 304 through 308, and compiles a list of differences to be contrasted at step 306. In step 304, Contrast Images Module 300 creates and displays a current rendered difference from the list of possible differences, and then prompts a user to accept or reject the difference at step 305. If the user accepts the difference, Contrast Images Module 300 updates the list of differences at step 306 before proceeding to step 307. If the user rejects the difference, Contrast Images Module 300 proceeds directly to step 307. At step 307, Contrast Images Module 300 determines if the current rendered difference is the last possible rendered difference. If it is, Contrast Images Module 300 exits execution at step 309. If it is not, Contrast Images Module 300 selects the next possible rendered difference as the current difference at step 308, and reenters the loop for compiling a list of selected differences by creating and displaying the current difference at step 304.

In one implementation, the set of rendered differences compiled in step 306 are previewed by simultaneously displaying them on a monitor. In another implementation, the set of rendered differences are previewed by simultaneously displaying their color values, e.g. RGB pixel values, on a monitor. In yet another implementation, the set of rendered differences are previewed by simultaneously printing them on a printer. Still other implementations are possible, and within the scope of the invention.

As shown in FIG. 1, Receive Selection Module 400 receives a contrasted rendered image from Contrast Images Module 300. In one implementation, Contrast Images Module 300 simultaneously displays rendered images or differences on a monitor. A user selects one of the rendered images or differences from the monitor, e.g. by positioning a mouse over the image and selecting it with a mouse click. In another implementation, Contrast Images Module 300 displays a list of rendered images or differences, together with an associated checklist. A user selects a desired rendered image or difference by checking the appropriate check box. In yet another implementation, Contrast Images Module 300 displays the rendered images together with an identification tag, such as a number, letter, or name, and prompts the user to enter a rendered image selection. For example, a user could enter the number 5 at a keyboard to select the rendered image labeled 5. These and other implementations are within the scope of the present invention.

Receive Selection Module 400 identifies the selected rendered image or difference, and notifies Selection Engine 50. Selection Engine 50 receives the contrasted rendered image or difference, identifies the received rendering intent corresponding to the received rendered image or difference, and selects it to render the color image. When Selection Engine 50 receives a rendered difference, it first identifies the reference image as being the source image or another rendered image. If the reference image is the source image, Selection Engine 50 identifies the selected rendering intent as the intent used to create the rendered image. If the reference image is another rendered image, Selection Engine 50 prompts a user to identify one of the two rendering intents used to create the two rendered images as the selected rendering intent.

This invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A computer implemented method for selecting a rendering intent, the method comprising:
   performing in one or more computers operations comprising:
      receiving a source color image having colors within a source color gamut;
      receiving a plurality of rendering intents, wherein each rendering intent defines a mapping of colors from the source color gamut to a destination color gamut;
      generating a plurality of rendered images by rendering the source image using the received plurality of rendering intents;
      receiving input selecting a contrast mode from a plurality of contrast modes, wherein each contrast mode of the plurality of contrast modes specifies a way to contrast and simultaneously preview the plurality of rendered images;
      simultaneously previewing the plurality of rendered images according to the selected contrast mode; and
      selecting a rendering intent by receiving from a user a selected image from the plurality of rendered images simultaneously previewed according to the selected contrast mode.

2. The method of claim 1, wherein the rendered images are contrasted by simultaneously previewing them as a plurality of rendered images.

3. The method of claim 1, wherein the rendered images are contrasted by simultaneously previewing them as a plurality of rendered differences.

4. The method of claim 1, wherein the step of simultaneously previewing a plurality of rendered images comprises simultaneously displaying them on a monitor.

5. The method of claim 1, wherein the step of simultaneously previewing a plurality of rendered images comprises printing them on a single sheet of paper.

6. The computer storage medium encoded with the computer program of claim 1, wherein the rendered images are contrasted by simultaneously previewing them as a plurality of rendered images.

7. The computer storage medium encoded with the computer program of claim 1, wherein the rendered images are contrasted by simultaneously previewing them as a plurality of rendered differences.

8. The computer storage medium encoded with the computer program of claim 1, wherein the step of simultaneously previewing a plurality of rendered images comprises simultaneously displaying them on a monitor.

9. The computer storage medium encoded with the computer program of claim 1, wherein the step of simultaneously previewing a plurality of rendered images comprises printing them on a single sheet of paper.

10. The method of claim 1, wherein simultaneously previewing a plurality of rendered images comprises simultaneously displaying color values of the rendered images.

11. A computer storage medium encoded with a computer program comprising instructions operable to cause a programmable processor to:
   receive a source color image having colors within a source color gamut;
   receive a plurality of rendering intents, wherein each rendering intent defines a mapping of colors from the source color gamut to a destination color gamut;
   generate a plurality of rendered images by rendering the source image using the received plurality of rendering intents;
   receive input selecting a contrast mode from a plurality of contrast modes, wherein each contrast mode of the plurality of contrast modes specifies a way to contrast and simultaneously preview the plurality of rendered images;
   simultaneously preview the plurality of rendered images according to the selected contrast mode; and
   select a rendering intent by receiving from a user a selected image from the plurality of rendered images simultaneously previewed according to the selected contrast mode.

12. The computer storage medium of claim 11, wherein simultaneously previewing a plurality of rendered images comprises simultaneously displaying color values of the rendered images.

13. A computer implemented method for selecting a rendering intent, the method comprising:
   performing in one or more computers operations comprising:
      receiving a source color image having colors within a source color gamut;
      receiving a plurality of rendering intents, wherein each rendering intent defines a mapping of colors from the source color gamut to a destination color gamut;
      generating a plurality of rendered images by rendering the source image using the received plurality of rendering intents;
      receiving input selecting to contrast the rendered images by simultaneously previewing them as a plurality of rendered image differences, where each rendered image difference is constructed from the differences between a rendered image and a reference image;
      simultaneously previewing the plurality of rendered image differences, where the rendered image differences are generated according to the received input; and selecting a rendering intent by receiving from a user a selected image from the plurality of rendered image differences simultaneously previewed according to the received input.

14. The method of claim 13, wherein the rendered image difference for a rendered image is generated by subtracting the reference image from the rendered image.

15. The method of claim 13, wherein the rendered image difference for a rendered image is generated by calculating the least squares difference between the rendered image and the reference image.

16. The method of claim 13, wherein the rendered image difference for a rendered image is generated by representing the differences between the rendered image and the reference image as a topographical map.

17. A computer storage medium encoded with a computer program comprising instructions operable to cause a programmable processor to:
receive a source color image having colors within a source color gamut;
receive a plurality of rendering intents, wherein each rendering intent defines a mapping of colors from the source color gamut to a destination color gamut;
generate a plurality of rendered images by rendering the source image using the received plurality of rendering intents;
receive input selecting to contrast the rendered images by simultaneously previewing them as a plurality of rendered image differences, where each rendered image difference is constructed from the differences between a rendered image and a reference image;
simultaneously preview the plurality of rendered image differences, where the rendered image differences are generated according to the received input; and
select a rendering intent by receiving from a user a selected image from the plurality of rendered image differences simultaneously previewed according to the received input.

18. The computer storage medium of claim 17, wherein the rendered image difference for a rendered image is generated by subtracting the reference image from the rendered image.

19. The computer storage medium of claim 17, wherein the rendered image difference for a rendered image is generated by calculating the least squares difference between the rendered image and the reference image.

20. The computer storage medium of claim 17, wherein the rendered image difference for a rendered image is generated by representing the differences between the rendered image and the reference image as a topographical map.

21. An apparatus comprising:
a processor;
a storage device coupled to the processor and configurable for storing instructions, which, when executed by the processor, cause the processor to perform operations comprising:
receiving a source color image having colors within a source color gamut;
receiving a plurality of rendering intents, wherein each rendering intent defines a mapping of colors from the source color gamut to a destination color gamut;
generating a plurality of rendered images by rendering the source image using the received plurality of rendering intents;
receiving input selecting a contrast mode from a plurality of contrast modes, wherein each contrast mode of the plurality of contrast modes specifies a way to contrast and simultaneously preview the plurality of rendered images;
simultaneously previewing the plurality of rendered images according to the selected contrast mode; and
selecting a rendering intent by receiving from a user a selected image from the plurality of rendered images simultaneously previewed according to the selected contrast mode.

22. The apparatus of claim 21, wherein the rendered images are contrasted by simultaneously previewing them as a plurality of rendered images.

23. The apparatus of claim 21, wherein the rendered images are contrasted by simultaneously previewing the rendered images as a plurality of rendered differences.

24. The apparatus of claim 21, wherein simultaneously previewing a plurality of rendered images comprises simultaneously displaying the rendering images on a monitor.

25. The apparatus of claim 21, wherein simultaneously previewing a plurality of rendered images comprises displaying color values of the rendered images.

* * * * *

UNITED STATES PATENT AND TRADEMARK OFFICE
CERTIFICATE OF CORRECTION

PATENT NO. : 7,639,262 B2
APPLICATION NO. : 11/226481
DATED : December 29, 2009
INVENTOR(S) : Ioana M. Danciu It is certified that error appears in the above-identified patent and that said Letters Patent is hereby corrected as shown below:

Column 1, under "CROSS-REFERENCE TO RELATED APPLICATION", line 6, after "claims the benefit of priority to" insert -- and is a Continuation of --.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,639,262 B2 Page 1 of 1
APPLICATION NO. : 11/226481
DATED : December 29, 2009
INVENTOR(S) : Ioana M. Danciu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 573 days.

Signed and Sealed this

Ninth Day of November, 2010

David J. Kappos
*Director of the United States Patent and Trademark Office*